United States Patent
Finseth et al.

(10) Patent No.: US 6,665,870 B1
(45) Date of Patent: Dec. 16, 2003

(54) NARRATIVE ELECTRONIC PROGRAM GUIDE WITH HYPER-LINKS

(75) Inventors: Craig A. Finseth, St. Paul, MN (US); Jeffrey A. Brown, Roseville, MN (US); Philip E. Hsiao, Eden Prairie, MN (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/536,097

(22) Filed: Mar. 24, 2000

Related U.S. Application Data

(60) Provisional application No. 60/126,722, filed on Mar. 29, 1999.

(51) Int. Cl.[7] .......................... H04N 7/025; H04N 7/10; H04N 5/445; G06F 3/00; G06F 13/00
(52) U.S. Cl. ..................... 725/40; 725/51; 725/52
(58) Field of Search ..................... 725/51, 52, 39, 725/40; 345/710

(56) References Cited

U.S. PATENT DOCUMENTS

| | | | | |
|---|---|---|---|---|
| 5,903,816 A | * | 5/1999 | Broadwin et al. | 725/110 |
| 6,008,803 A | * | 12/1999 | Rowe et al. | 725/40 |
| 6,018,768 A | * | 1/2000 | Ullman et al. | 709/218 |
| 6,025,837 A | * | 2/2000 | Matthews et al. | 725/51 |
| 6,151,059 A | * | 11/2000 | Schein et al. | 725/52 |
| 6,172,677 B1 | * | 1/2001 | Stautner et al. | 345/716 |
| 6,199,206 B1 | * | 3/2001 | Nishioka et al. | 725/51 |
| 6,263,501 B1 | * | 7/2001 | Schein et al. | 725/39 |
| 6,268,849 B1 | * | 7/2001 | Boyer et al. | 725/40 |
| 6,442,755 B1 | * | 8/2002 | Lemmons et al. | 725/51 |
| 6,469,753 B1 | * | 10/2002 | Klosterman et al. | 725/40 |
| 6,522,342 B1 | * | 2/2003 | Gagnon et al. | 345/716 |

* cited by examiner

*Primary Examiner*—John Miller
*Assistant Examiner*—Scott Beliveau
(74) *Attorney, Agent, or Firm*—John A. Crook; Michael W. Sales

(57) ABSTRACT

A device for generating a display of an electronic program guide on a screen includes a receiver having a tuner which receives an input stream of television content and electronic program guide data, and which separates the electronic program guide data from the input stream. A memory is coupled to the tuner to store the electronic program guide data separated from the input stream. A display generator creates a display which combines a set of electronic program guide data. The display includes a narrative text written in a story-like manner. The narrative text resembles a magazine article and includes a hyper-link that provides a link to a television program. The display includes a program title, a program subject matter description, and a time of transmission. A controller which is coupled to the tuner, the memory, and the display generator receives a user tuning request generated by selecting the hyper-link from the narrative text, and signals the display generator to create a display of the television program.

13 Claims, 10 Drawing Sheets

FIG: 5

NARRATIVE ELECTRONIC PROGRAM GUIDE WITH HYPER-LINKS

CROSS-REFERENCE TO RELATED APPLICATION

This application claims the benefit of U.S. Provisional Application No. 60/126,722, filed Mar. 29, 1999.

BACKGROUND OF THE INVENTION

The present invention relates to the electronic display of television program guide information on a screen. More specifically, the invention relates to a method of organizing and displaying program information in such a manner as to allow for optimal use of the area available on the television screen.

Television programs are distributed to viewers by a variety of broadcasting methods. These methods include traditional analog broadcast television, the upcoming digital broadcast television, cable television (both analog and digital), satellite broadcasting (both analog and digital), as well as other methods. These methods allow channels to be multiplexed and transmitted over a common transmission medium. Because television broadcasting systems can have hundreds of channels, there must be some mechanism for informing the viewer of the content available on the various channels. Electronic television program guides have proven to be an effective means for providing this information.

Program guides for television programming are known in the art. A common method for obtaining television programming information is by consulting paper television programming guides or schedules. This method of disseminating information, however, has limitations. A paper guide may become obsolete or a schedule may change, rendering the paper copy useless. Additionally, the paper schedule may easily be lost.

Electronic program guides have been proposed to alleviate some of the limitations of paper. One example is a cable system that provides a continuous feed of guide information to a dedicated television channel. The channel displays continuous program listings. The continuous nature of the link allows the guide to be updated and to reflect current scheduling information. An alternate method of providing guide content is to send it, along with program content, via satellite transmissions to receiving stations.

Previous program guides have been burdened with limitations. Prior television electronic program guides are based around the use of a scheduling grid. This grid typically involves one axis which corresponds to time and another axis which corresponds to transmission channels. At the intersection of each channel and time slot is a "cell" which typically displays the title of the program that is being shown on that channel at that time. The problem with this grid-type display format is that when the number of channels available to the user is more than 15 to 20, it becomes necessary for the viewer to scroll further through the listings, bringing up screen after screen of possible programs and channels. Additionally, if the viewer wishes to look ahead in the schedule, the viewer must scroll again to another section of the grid in order to get a complete viewing of programs being broadcast later in the day, week, etc.

The number of television channels and programming alternatives available to the consumer has been increasing dramatically. Under the current grid format, an expanding number of channels are being pushed onto a single screen. The result is that the text of the display becomes so small as to become difficult to read, or the titles and descriptions of the programs become truncated so as to provide very little information to the viewer. Due to the overwhelming amount of information and options, it is necessary to have a method of displaying and sorting all the available programming information for the television viewer in an efficient manner.

Collectively, prior electronic program guide systems are frustrating to the viewer because they do not give the viewer an aesthetically pleasing and intuitive way to provide information. Adding a description of the program for each active cell in the grid, or requiring the viewer to go through a hierarchy of screens of categories has not alleviated the problem of giving the viewer an intuitive and informative method of determining what programming is available.

BRIEF SUMMARY OF THE INVENTION

The present invention provides an alternative for presenting television programming information. The information is displayed in a "narrative" or "magazine" type format and may include hyper-links. Using this method, narrative text is presented to the viewer, giving a description of programs and hyper-links which enable switching directly to described programs, or switching to obtain additional information about particular programs. In one embodiment, the viewer is given display choices via hyper-links that are interspersed in the text.

The use of narrative text in the electronic program guide presents the viewer with an intuitive and informative display. Furthermore, the viewer can make programming selections quickly and receive information about desired program choices immediately using uncomplicated navigational commands such as hyper-links.

According to one aspect, a device for displaying program information in an on-screen video display includes a tuner adapted to receive electronic program guide data, a memory operatively coupled to the tuner and adapted to store the electronic program guide data and a converter operatively coupled to the memory and the tuner, the converter being adapted to convert the electronic program guide data into an on-screen video display, wherein the on-screen video display comprises a hyper-link associated with information for display. The device further includes a user interface receiver adapted to receive a user command to select the hyper-link and a controller communicatively coupled to the user interface receiver, the converter and the tuner. The controller is adapted to receive the user command and to control the converter and the tuner to display the information associated with the hyper-link. The on-screen video display may be narrative text written, in a story-like format having paragraphs and organizational categories that provide a first-level organization that defines overall content of the on-screen video display and a second-level organization that defines the content of the paragraphs of the narrative text.

In other embodiments, the information associated with the hyper-links may be television content or additional electronic program guide data. The additional program guide data may include program or actor information about a program to be broadcast, information defining and describing a program channel or links to operating menus. The organizational categories may include colors that distinguish the organizational categories. The organizational categories may also provide additional levels of organization with respect to the on-screen video display.

Additionally, the device may include a storage device operatively coupled to the converter and which is adapted to record television content. The on-screen video display may further include a recording menu hyper-link that provides a link to a menu for recording television content and for controlling the storage device.

Further, the device may include a remote control adapted to generate a user command, wherein the remote control includes dedicated buttons to direct the controller to perform an operational function. Operational functions may include signaling a recording device to record television content, signaling the tuner to receive television content and setting a reminder in the memory to display specified television content when the specified television content is received by the tuner.

According to a second aspect, a method of displaying program information in an on-screen video display includes the steps of receiving electronic program guide data, storing the electronic program guide data and converting the electronic program guide data into an on-screen video display, wherein the on-screen video display includes a hyper-link associated with information for display and wherein the on-screen video display includes narrative text written in a story-like format having paragraphs. The method may also include the steps of receiving a user command to select the hyper-link and displaying the information associated with the hyper-link.

According to a third aspect, a system for distributing and processing data representative of an electronic program guide includes a program guide data transmitting system adapted to receive and process schedule feeds to produce program guide data and to broadcast the program guide data and a receiver station adapted to receive the broadcast of the program guide data from the program guide data transmitting system. In such an embodiment, the receiver station includes a tuner adapted to receive the program guide data and a memory operatively coupled to the tuner which stores the program guide data. The receiver station further includes a converter operatively coupled to the memory and the tuner, the converter being adapted to convert the program guide data into an on-screen video display, wherein the on-screen video display comprises a hyper-link associated with information for display and wherein the on-screen video display may be narrative text written in a story-like format having paragraphs. The receiver station also includes a user interface receiver adapted to receive a user command to select the hyper-link and a controller communicatively coupled to the user interface receiver and the tuner, the controller being adapted to receive the user command and to control the tuner to display the information associated with the hyper-link.

According to a fourth aspect, a method of creating an electronic program guide includes the steps of storing program guide data and selecting a first set of data from the stored program guide data including at least one program title, at least one time of transmission and at least one subject matter description. The method further includes the steps of arranging the first set of data into an on-screen video display having a hyper-link that causes information associated with the hyper-link to be displayed when the hyper-link is selected and displaying the on-screen video display, wherein the on-screen video display may include narrative text written in a story-like format having paragraphs.

According to a fifth aspect, a method of creating an electronic program guide includes the steps of storing program guide data, selecting a first set of data from the stored program guide data including at least one program title, at least one time of transmission and at least one subject matter description, arranging the first set of data into an on-screen video display including narrative text written in a story-like format and displaying the on-screen video display.

The invention itself, together with further objects and attendant advantages, will be best understood by reference to the following detailed description, taken in conjunction with the accompanying drawings.

DETAILED DESCRIPTION

Although the present invention has been described with reference to preferred embodiments, workers skilled in the art will recognize that changes may be made in form and detail without departing from the spirit and scope of the invention.

I. Delivery of Electronic Program Guide Data

Figure 1:
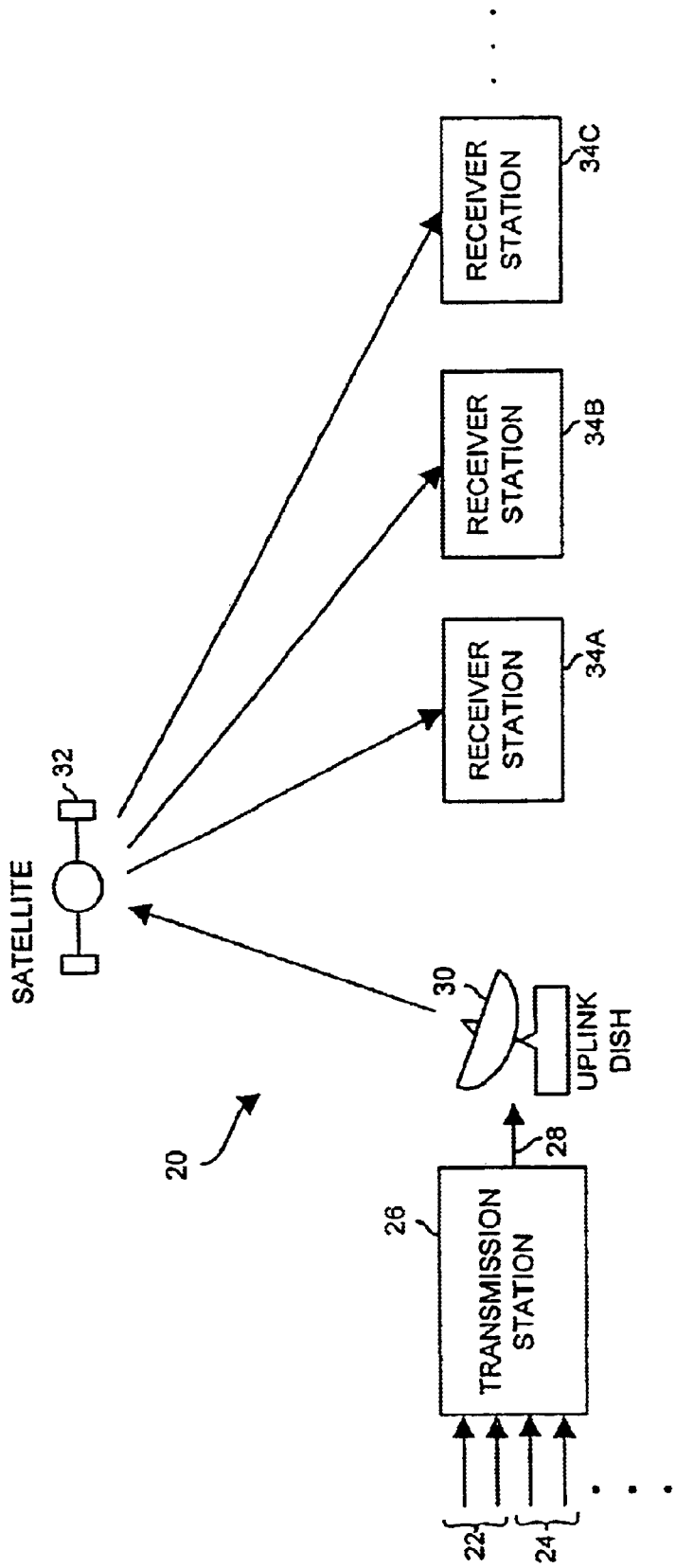
FIG. 1 is a block diagram of a television broadcasting system for the transmission, receipt and display of television content and electronic program guide data.

FIG. 1 depicts a broadcast medium suitable for delivering electronic program guide data which can be displayed according to the teachings herein. Specifically, FIG. 1 is a block diagram of an electronic program guide data delivery system 20 which transmits and receives audio, video and data signals via satellite. Although the present electronic program guide format is described in the context of using a satellite-based television broadcasting system, the electronic program guide data can be delivered using other methods of television content delivery. Examples of other delivering methods include over-the-air systems and cable-based systems.

One method of delivering the electronic program guide is a satellite-based electronic program guide delivery system 20. This satellite based system includes transmission station 26, uplink dish 30, satellite 32, and receiver stations 34A–34C (collectively referred to as receiver stations 34). Transmission station 26 includes a plurality of input lines 22 for receiving various signals, such as analog television signals, digital television signals, video tape signals, original programming signals and computer generated signals containing Hyper Text Markup Language (HTML) content. Additionally, input lines 22 receive signals from digital video servers having hard discs or other digital storage media associated therewith. Each input line 22 typically corresponds to a single television channel. Transmission station 26 also includes a plurality of schedule feeds 24, which provide electronic schedule information about the timing, content, and transmission channels of various television programs. The electronic schedule information from schedule feeds 24 is converted into program guide data by transmission station 26.

Transmission station 26 receives and processes the various-input signals received on input lines 22 and schedule feeds 24, converts the received signals into a standard form, combines the standard signals into a single output data stream 28, and continuously sends output data stream 28 to uplink dish 30. Output data stream 28 is preferably a modulated signal, which is modulated by transmission station 26 using standard frequency and polarization modulation techniques.

Uplink dish 30 continuously receives output data stream 28 from transmission station 26, amplifies the received signal and transmits the signal to satellite 32. Although a single uplink dish and satellite are shown in FIG. 1, multiple dishes and satellites are preferably used to provide additional bandwidth, and to help ensure continuous delivery of signals.

Satellite 32, which preferably revolves in geosynchronous orbit about the earth includes a plurality of transponders that receive signals transmitted by uplink dish 30, amplify the received signals, frequency shift the received signals to higher frequency bands, and then transmit the amplified frequency shifted signals back to receiver stations 34.

Receiver stations 34 receive and process the signals transmitted by satellite 32. Receiver stations 34 include hardware and software for separating the electronic program guide data from the received signals, and processing and displaying the electronic program guide data. Receiver stations 34 are described in further detail below with respect to FIG. 3.

Figure 2:
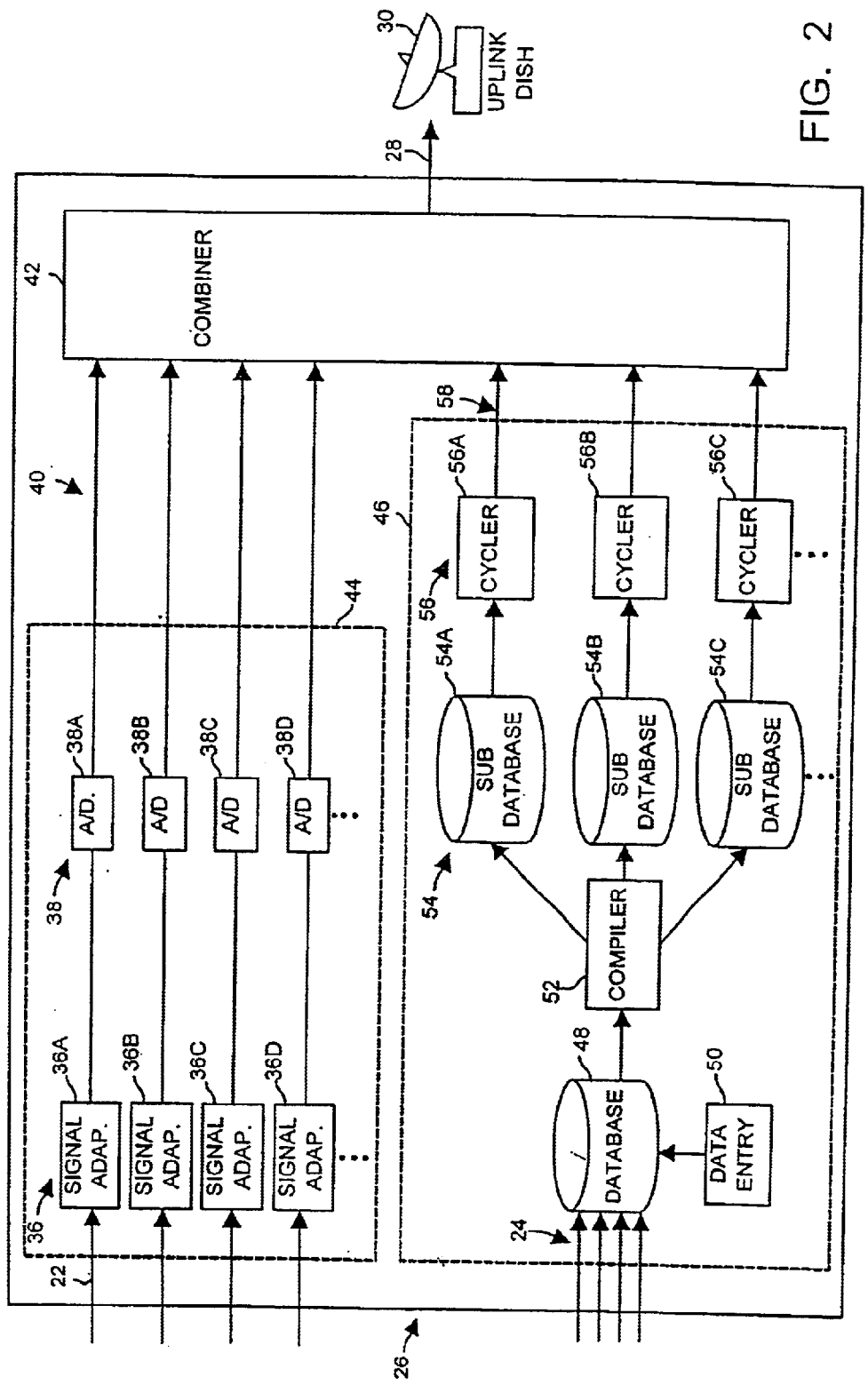
FIG. 2 is a block diagram of the transmission station of the system shown in FIG. 1.

FIG. 2 is a block diagram of one possible program transmission station 26. Transmission station 26 includes program transmitting system 44 and program guide transmitting system 46. Program transmitting system 44 includes input signal adapters 36A–36D (collectively referred to as input signal adapters 36), analog to digital (A/D) converters 38A–38D (collectively referred to as A/D converters 38), and a combiner 42. Input signal adapters 36 are coupled to A/D converters 38, and the A/D converters 38 are coupled to the combiner 42. Although four input signal adapters 36 and four A/D converters 38 are shown in FIG. 2, several more will typically be used in commercial systems.

Input signal adapters 36 receive input signals from input lines 22, and convert the input signals to a standard form. As mentioned above, signals from input lines 22 include analog television signals, digital television signals, video tape signals and original programming signals. Input signal adapters 36 preferably convert the input signals to a high quality analog format. The high quality analog signals are output by input signal adapters 36 to A/D converters 38. A/D converters 38 then convert the analog signals received from input signal adapters 36 to digital signals, and associated circuitry (not shown) compresses the digital signals using MPEG2 encoding, although other compression schemes may be used.

During the MPEG2 encoding step, A/D converters 38 also perform a statistical multiplexing operation. During the statistical multiplexing operation, A/D converters 38 determine the amount of bandwidth that each channel will use. The amount of bandwidth allowed for each channel is determined based upon the content of the signal on that channel, and the amount of bandwidth used by other channels. For a program such as the motion picture "Independence Day", which has a very dynamic picture content with a great deal of movement and numerous bright explosions, the signal can not be compressed as much as a more static video signal like an information channel. The greater the dynamic content of the signal, the less it can be compressed and the greater the bandwidth required.

Typically, 30 Mega bits of data per second are transmitted by uplink dish 30 for each transponder in the satellite 32. Each transponder receives and transmits data for about 6 channels. Thus, each channel occupies approximately 5 Mega bits of data per second, on average. During the statistical multiplexing operation, the amount of compression for each channel, and correspondingly the amount of information transmitted for each channel, is adjusted up or down depending upon the amount of available space for each transponder. Combiner 42 feeds information back to the A/D converters 38 during the statistical multiplexing operation, informing A/D converters 38 of the amount of bandwidth used by various channels. The A/D converters 38 then adjust the amount of compression of a signal based on the information fed back from the combiner 42.

The MPEG2 encoded digital data are output by A/D converters 38 to combiner 42. Combiner 42 groups the MPEG2 encoded digital data from each A/D converter 38 into a plurality of packets, with each such packet marked with a service channel identification (SCID) number. The SCIDs are later used by receiver 64 (shown in FIG. 3) to identify the packets that correspond to each television channel. Combiner 42 combines all of the packets for all of the channels, adds error correction data, and outputs a single output data stream 28 to uplink dish 30.

Program transmitting system 44 processes audio signals in the same manner as video signals, and combiner 42 combines digital audio signals with the digital video signals. Combiner 42 also receives electronic program guide data from input lines 58 and adds that data to the output data stream 28. The assembly and processing of the electronic program guide data prior to it being sent to combiner 42 is described in more detail below.

Also shown in FIG. 2 is an example of one possible program guide data transmitting system 46. Program guide data transmitting system 46 includes data entry station 50, program guide database 48, compiler 52, sub-databases 54A–54C (collectively referred to a sub-databases 54) and cyclers 56A–56C (collectively referred to as cyclers 56).

Schedule feeds 24 provide electronic schedule information about the timing, content and transmission channels and additional information of various television programs, such as that found in television schedules contained in newspapers and paper television guides. Schedule feeds 24 preferably include information from at least one company that specializes in providing schedule information, such as GNS, Tribune Media Services and T.V. Data. The data provided by companies such as GNS, Tribune Media Services and T.V. Data are typically transmitted over telephone lines as schedule feeds 24 to program guide database 48. These companies provide television schedule data for all of the television stations across the nation plus the nationwide channels, such as Showtime, HBO, and the Disney Channel. The specific format of the data that is provided by these companies varies from company to company. Additionally, program guide database 48 preferably includes schedule data for television channels across the entire nation including all nationwide channels and local channels, regardless of whether the channels are transmitted by transmission station 26.

Program guide database 48 is a computer-based system that receives schedule data from schedule feeds 24 and organizes the data into program guide data of a standard format. Compiler 52 reads the standard form program guide data out of program guide database 48, identifies common schedule portions, converts the program guide data into the proper format for transmission to users (specifically the program guide data are converted into objects as discussed below) and outputs the program guide data to one or more of sub-databases 54.

Program guide data is also entered manually into the program guide database 48 through data entry station 50. Data entry station 50 allows an operator to enter additional scheduling information, as well as to combine and organize data supplied by the scheduling companies. When the operator enters and combines the data, he or she enters editorial comments, links data together with transitional words and punctuation, organizes the data into paragraph form, and supplies any additional information he or she wishes to provide to the user. As with the computer organized data, the manually entered data is converted by the compiler into separate objects and is sent to one or more sub-data bases 54.

After compiler 52 converts the program guide data from program guide database 48 into the proper object format, compiler 52 outputs program guide objects to sub-databases 54. The program guide objects are temporarily stored in sub-databases 54 until cyclers 56 request the information. Each of cyclers 56 preferably transmits program guide objects to combiner 42 at a different rate than the other cyclers 56. For example, cycler 56A may transmit program guide objects to combiner 42 every second, while cyclers 56B and 56C may transmit program guide objects every 5 seconds and every 10 seconds, respectively.

All of the program guide objects output by the plurality of cyclers 56 are combined by combiner 42. Combiner 42 combines the program guide objects 58 with digital video and audio data output by A/D converters 38 on input lines 40. Combiner 42 transmits output data stream 28, which includes the program guide data and the digital video and audio data, to uplink dish 30. Output data stream 28, which is output by combiner 42, is a multiplexed signal that is modulated by combiner 42 using standard frequency and polarization modulation techniques.

Because the receiver 64 (shown in FIG. 3) may not always be on and receiving and saving program guide objects, the program guide objects are continuously retransmitted. Typically, program guide objects for programs that will be shown in the next couple of hours are sent more frequently than program guide objects for programs that will be shown in 12 hours or more.

II. Format of Transmitted Program Guide Data

Prior to transmitting program guide data to sub-databases 54, compiler 52 organizes the program guide data from program guide database 48 into objects. Each object preferably includes an object header and an object body. The object header identifies the object type, object ID and version number of the object. The object type identifies the type of the object. Some exemplary types of objects are discussed below. The object ID uniquely identifies the particular object from other objects of the same type. The version number of an object uniquely identifies the object from other objects of the same type and object ID. The object body includes data for constructing a portion of a program guide that is ultimately displayed on a user's television.

Prior to transmission, each object is preferably broken down by compiler 52 into multiple frames. Each frame is made up of a plurality of 126 byte packets with each such packet marked with a service channel identification (SCID) number. The SCIDs are later used by receiver 64 to identify the packets that correspond to each television channel. Each frame includes a frame header, program guide data and a checksum. Each frame header includes the same information as the object header described above—object type, object ID and version number. The frame header uniquely identifies the frame, and its position within a group of frames that make up an object. The program guide data within frames are used by receiver 64 (shown in FIG. 3) to construct and display a program guide on a user's television. The checksum is examined by receiver 64 to verify the accuracy of the data within received frames.

The following is a list of preferred object types, although many additional or different object types may be used: boot object, channel list object, channel object, master schedule object, general schedule object, boot event object, general program object, time object, deletion object, HTML object, and a reserved object.

A boot object identifies the SCIDs where all other objects can be found. A boot object is always transmitted on the same channel, which means that each packet of data that makes up a boot object is marked with the same SCID number. Boot objects are transmitted frequently to ensure that receivers 64 which have been shut off, and are then turned back on, immediately receive information indicating the location of the various program guide objects. Thus, boot objects are sent from compiler 52 to a cycler 56 with a high rate of transmission.

A channel list object contains a list of all the channel objects (discussed below) in a network. A network is a grouping of all channels from a common source, such as all Digital Satellite System (DSS) channels. For each channel object in the list of channel objects, the channel list object includes a channel object ID for that channel object. Each channel object is uniquely identified by its channel object ID.

Each channel object provides information about a particular channel. Each channel object points to a master schedule object (discussed below). Each channel object includes multiple fields or descriptors that provide information about that channel. Each descriptor includes a descriptor type ID that indicates the type of the descriptor. Descriptor types include "about" descriptors, "category" descriptors, and "reserved" descriptors. The "about" descriptor provides a description of the channel. When there is no "about" descriptor, the description defaults to a message such as "No Information Available". The "category" descriptor provides a category classification for the channel. More than one "category" descriptor can appear in the channel object if the channel falls into more than one category. "Category" descriptors preferably provide a two-tiered category classification, such as "sports/baseball" or "movie/drama", although any number of tiers may be used including single tiers. "Reserved" descriptors are saved for future improvements to the system.

A boot event object provides brief information about programs that are currently being broadcast or that will be broadcast in the near future (e.g., within the next two hours) on a particular channel. Thus, each boot event object is associated with one particular channel object, and is not shared among different channel objects. The information provided by the boot event object is not as complete as that provided by a general program object (discussed below). The function of the boot event object is to allow receiver 64 to quickly acquire program information after receiver 64 is powered up. Receiver 64 then continues acquiring complete program information in the background from general program objects. Because the purpose of boot event objects is to provide receiver 64 with immediate program information, boot event objects are transmitted by a cycler 56 that has a high rate of transmission.

A general program object provides a complete description of a program. The general program object is pointed to by other objects (namely, master schedule objects, general schedule objects, and HTML objects) that contain the starting time and duration of the program. Like channel objects, descriptors are used within general program objects. General program objects use the same types of descriptors as channel objects. Category descriptors provide a category classification for a program and "about" descriptors provide a description of the program. If compiler 52 determines that a particular program is scheduled to appear on multiple channels, the general program object for that program is transmitted a single time for the multiple channels, although, as discussed above, it may be retransmitted multiple times.

A general schedule object points to a group of general program objects. A general schedule object is assigned a time duration by a master schedule object (discussed below). Each general schedule object identifies all of the general program objects that must be acquired for the assigned time duration. Each general schedule object is uniquely identified by a schedule object ID. A unique general schedule object may be pointed to by more than one master schedule object. As time progresses and the scheduling information becomes stale, the general schedule object is no longer needed. General schedule objects that are not referenced by any master schedule object are discarded by receiver 64.

A master schedule object contains the start time of the entire schedule, as well as the start time and duration of the general schedule objects and general program objects. A master schedule object points to general program objects and general schedule objects. The start time of the first general schedule object is given by the schedule start time. The start time of the next general schedule object is the time the previous general schedule object ends. As time progresses and the scheduling information becomes stale, a new master schedule object replaces the previous version, and updates the scheduling information. Thus, the channel object pointing to the master schedule object need not be updated. Only the master schedule object is updated.

A time object provides the current time of day and date at transmission station 26. Time objects include format codes that indicate which part of the date and time is to be displayed. For example, the only part of the date of interest might be the year. Similarly, whenever dates and times are transmitted within an object, the dates and times are accompanied by format codes. The format codes instruct receiver 64 which portion of the transmitted date and time to display.

A deletion object provides a list of object IDs that receiver 64 must discard.

HTML objects provide additional program guide information. Guide information that has been organized and manually entered by operators is converted into HTML objects. HTML objects can include text, image files in various formats such as GIF and JPEG, and video files in various formats such as Quicktime and MPEG.

HTML objects can be referenced by other HTML objects. For example, a GIF image can be used as an illustration in an HTML text block by referencing the GIF image HTML object from the text HTML object. Additionally, HTML objects can contain instructions that typically indicate that certain text should be highlighted and that point at other program guide objects. These referenced instructions are called "hyper-links" (discussed below with respect to FIG. 7). The highlighted text associated with a set of nested hyper-link instructions is ultimately displayed on a user's screen, and the displayed text is also referred to as a "hyper-link." Hyper-links that are displayed on a user's screen are selectable by a user using a device such as remote control 86. When a hyper-link is selected, data from HTML objects that are pointed to by the hyper-link are displayed.

Reserved objects are saved for future improvements to the program guide system. When a new type of object is defined, all objects of that new type will include an object header with a reserved object type.

A name system object defines a name system. Each name system object is uniquely identified by a name system object ID. A name system is essentially a table of data that assigns an entry ID for each entry in the table. For example, a name system might be used for program credits. For such a name system, the table would look something like the following:

| Entry | Entry ID # |
|---|---|
| "Actor" | 10 |
| "Director" | 11 |
| "Producer" | 12 |
| "Role" | 13 |

Other names systems include Program Information (e.g., "Title", "Description", "Year of Production", etc.), Languages (e.g., "English", "Spanish", "French", etc.), and Lengths (e.g., "Short", "Medium", "Long", etc.). Name systems are used for any sets of data that are used frequently by receiver 64. The use of name systems reduces transmission bandwidth because frequently used data can be transmitted once, and then referred to later by codes (i.e., Name System Object ID and Entry ID).

Name system objects also occasionally include matching instructions. The matching instructions associate two or more entries within a name system, or associate one or more entries from one name system with one or more entries from a second name system. For example, the Credits Name System described above could include matching instructions to match the "Actor" entry with the "Role" entry:

| Entry | Entry ID # | Matching Instructions |
|---|---|---|
| "Actor" | 10 | Use Credits Name System, Entry 13 |
| "Director" | 11 | |
| "Producer" | 12 | |
| "Role" | 13 | |

If the following two name descriptors are transmitted:
(1) "Harrison Ford" [Name System Object ID for "Credits" name system, Entry ID for "Actor"]
(2) "Indiana Jones" [Name System Object ID for "Credits" name system, Entry ID for "Role"]

Receiver 64 will note the matching instructions when it accesses the Credits Name System Table, and will automatically match the two data elements "Indiana Jones: Harrison Ford".

III. Receipt and Processing of Program Guide Data

Figure 3:
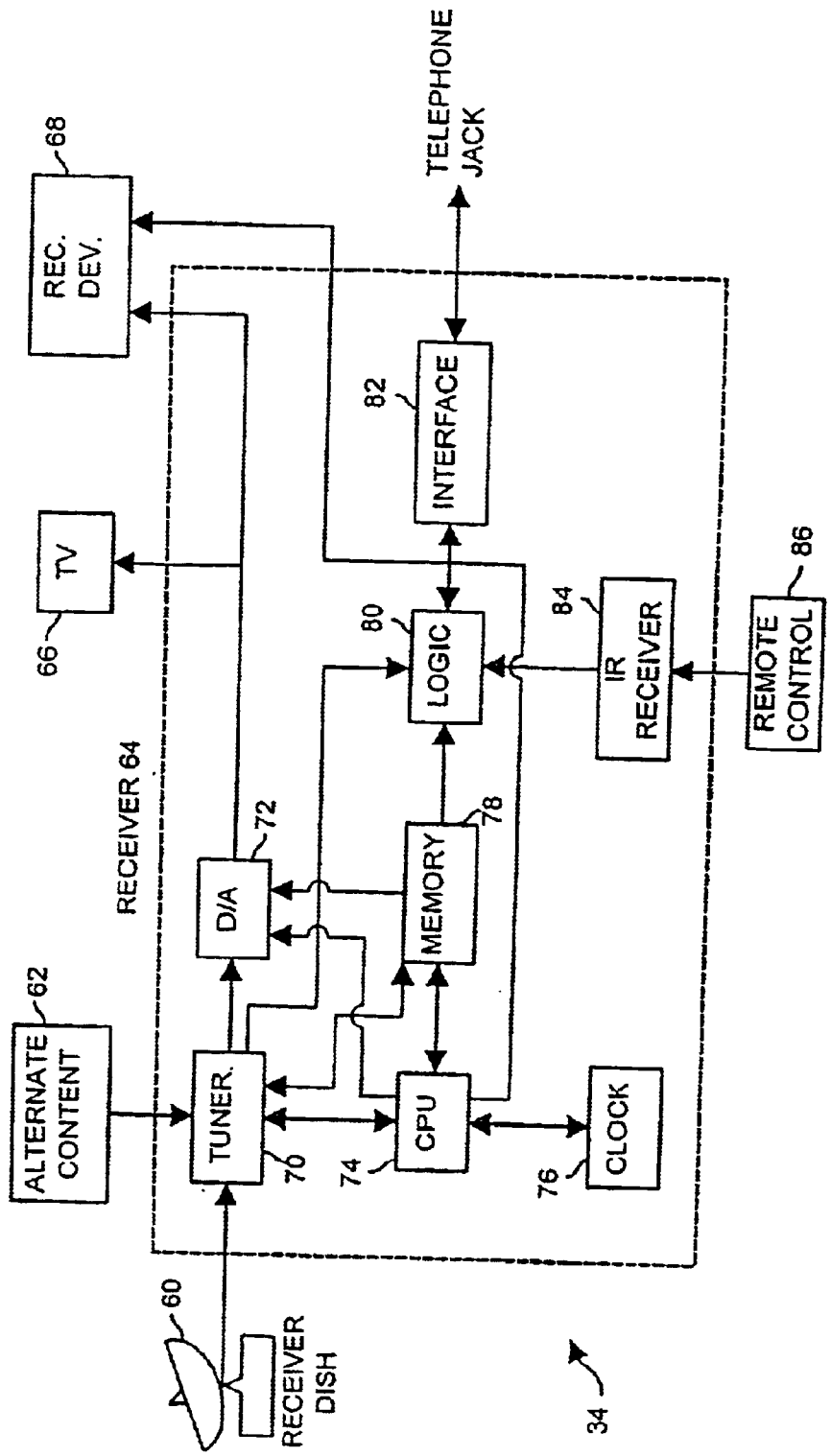
FIG. 3 is a block diagram of a receiver station for receiving and decoding audio, video and data signals.

FIG. 3 is a block diagram of one of receiver stations 34 which receives and decodes audio, video and data signals. Receiver station 34 includes receiver dish 60, receiver 64, television 66, recording device 68 and remote control 86.

Receiver 64 includes tuner 70, digital-to-analog (D/A) converter 72, CPU 74, clock 76, memory 78, logic circuit 80, interface 82, and infrared (IR) receiver 84.

Although this embodiment shows a receiving station located at the television, this is not the only acceptable embodiment. The electronic program guide may be assembled and generated at the transmitting site, and then transmitted as analog or digital signals over distance to the displaying device. Alternatively, the receiver may be combined with, or be a part of the displaying device. Thus, the transmitting, receiving, and displaying system described herein is but one embodiment of the invention. Other embodiments exist, one example being a computer with a monitor coupled to a network.

Receiver dish 60 receives signals sent by satellite 32, amplifies the signals and passes the signals on to tuner 70. Tuner 70 operates under control of CPU 74. The functions performed by CPU 74 are controlled by a control program stored in memory 78. Memory 78 also stores a parameter table, which includes a variety of parameters for receiver 64 such as a list of channels for which receiver 64 is authorized to process and generate displays, the zip code and area code for the area in which receiver 64 is used, and the model number of receiver 64. Clock 76 provides the current local time to CPU 74. Interface 82 is preferably coupled to a telephone jack at the site of receiver station 34. Interface 82 allows receiver 64 to communicate with transmission station 26 via telephone lines. Interface 82 may also be used to transfer data to and from a network, such as the Internet.

The signals sent from receiver dish 60 to tuner 70 are digital signals that are grouped into a plurality of packets. Each packet includes a header that identifies the SCID number for the packet, and the type of data contained in the packet (e.g., audio data, video data, or program guide data). Tuner 70 includes multiple output lines for transmitting video data, audio data, and program guide data. As packets are received from receiver dish 60, tuner 70 identifies the type of each packet. If tuner 70 identifies a packet as program guide data, tuner 70 outputs the packet to memory 78. Program guide data is stored in a guide database in memory 78.

Initially, as data enters receiver 64, tuner 70 looks for a boot object. Boot objects are always transmitted with the same SCID number, so tuner 70 knows that it must look for packets marked with that identification number. A boot object identifies the identification numbers where all other program guide objects can be found. The information from the boot object is used by tuner 70 to identify packets of program guide data and route them to memory 78.

As program guide data is received and stored in the guide database in memory 78, CPU 74 acts as a control device and performs various operations on the data in preparation for displaying a program guide on television 66. These operations include packet assembly, object assembly and object processing.

The first operation performed on the program guide data stored in the guide database in memory 78 is packet assembly. During the packet assembly operation, CPU 74 examines the stored program guide data and determines the locations of the packet boundaries.

The next step performed by CPU 74 is object assembly. During the object assembly step, CPU 74 combines packets to create object frames, and then combines the object frames to create program guide objects. CPU 74 examines the checksum transmitted within each object frame, and verifies whether the frame data was accurately received. If the object frame was not accurately received, it is discarded from memory 78. Also during the object assembly step, receiver 64 discards assembled objects that are of an object type that receiver 64 does not recognize. Receiver 64 maintains a list of known object types in memory 78. CPU 74 examines the object header of each received object to determine the object type. CPU 74 compares the object type of each received object to the list of known object types stored in memory 78. If the object type of an object is not found in the list of known object types, the object is discarded from memory 78. Similarly, receiver 64 maintains a list of known descriptor types in memory 78, and discards any received descriptors that are of a type not in the list of known descriptor types.

The last step performed by CPU 74 on received program guide data is object processing. During the object processing step, the objects stored in the guide memory 78 are combined to create a digital image of a program guide. HTML objects are used by CPU 74 to create the narrative text electronic program guide. A boot object instructs the CPU 74 which HTML object is the first object to be processed for each guide page. Instructions within this first HTML object then direct CPU 74 to incorporate other HTML objects or to create user accessible hyper-links to other program objects (discussed below with respect to FIG. 7). The digital image of the electronic program guide is later converted to an analog signal that is sent by the receiver 64 to television 66 for display to a user. Television 66 may alternatively be a digital television, in which case a digital to analog conversion would not be necessary.

When a user requests the display of a program guide by pressing the "guide" button on remote control 86, a guide request signal is received by IR receiver 84 (shown in FIG. 3) and is transmitted to logic circuit 80. Logic circuit 80 informs CPU 74 of the guide request. In response to the guide request, CPU 74 causes memory 78 to transfer the program guide digital image to D/A converter 72. D/A converter 72 converts the program guide digital image into a standard analog television signal, which is then transmitted to television 66. Television 66 then displays the program guide.

Users interact with the electronic program guide using remote control 86. Examples of user interactions include selecting a particular channel or requesting additional guide information. Remote control 86 emits infrared signals that are received by infrared (IR) receiver 84 in receiver 64. Other types of data entry devices may alternatively be used, such as an ultra-high frequency (UHF) remote control, a keypad on receiver 64, a remote keyboard and a remote mouse. When a user selects a channel using remote control 86, IR receiver 84 relays the user's selection to logic circuit 80, which then passes the selection on to memory 78 where it is accessed by CPU 74. CPU 74 instructs tuner 70 to output the audio and video packets for the selected channel to D/A converter 72. D/A converter 72 converts the packets to analog signals, and outputs the analog signals to television 66.

IV. Narrative Electronic Program Guide Format

The program guide disseminates information in a "story-like" manner in that it is written using sentences and paragraphs. One of the main differences between the program guide described herein and program guides shown in the prior art is that the presently disclosed program guide does not simply list data in disconnected pieces, but instead ties data items together, relating them to each other, using connecting text language. A second difference between the program guide disclosed herein and prior art program guides is the use of a hyper-link in the program guide to provide access to additional information.

In accordance with the invention, receiver 64 combines HTML objects stored in memory 78 in a manner that creates an electronic program guide that resembles a magazine article. The resemblance between the program guide described herein and a magazine article (or newspaper article or any other short prose composition) lies in the manner in which the information is disseminated.

A topic or theme is established as the subject that will be discussed in the text of the program guide. This is the first level of organization for the article. The article is broken down further into sub-topics which usually occur at the paragraph level. The sub-topics may not appear to relate to one another individually, however when they are put in the context of the overarching topic or theme, their relation to one another becomes apparent. For example, a magazine article may be titled "How to Lose Weight in Five Days" with paragraphs detailing caloric intake, nutritional values of foods and methods of exercise. These sub-topics relate to one another under the overall theme of losing weight. Additionally, the text transitions from one sub-topic to the next by relating the sub-topics to one another or relating the sub-topics to the main topic. To further facilitate the dissemination of information, the article may use pictures, figures, and/or various types of methods to highlight text. The subject of the article can be persuasive in content, giving opinions and editorializing, it may be informative, providing factual information, and it may be a combination, providing both factual information and editorial comments. The electronic program guide described herein uses these methods to provide information about upcoming television programs.

Figure 4:
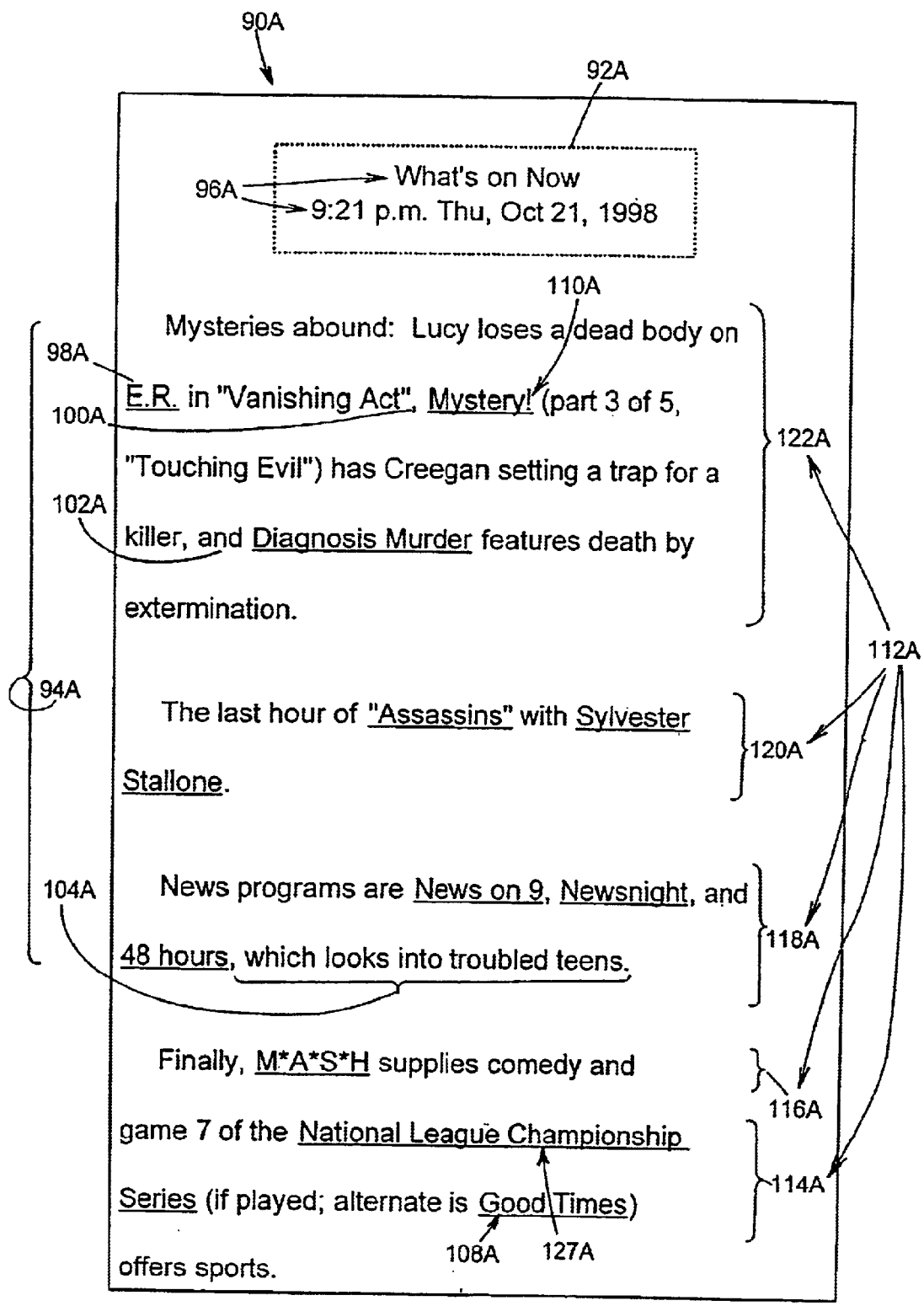
FIG. 4 depicts a display showing a television program guide in accordance with an embodiment of the present invention, primarily organized by time.

FIG. 4 depicts a preferred embodiment of narrative electronic program guide 90A as generated by receiver 64. Program guide 90A includes guide title region 92A and narrative text 94A. The text displayed in guide title region 92A in this embodiment is a current time of transmission 96A. Narrative text 94A includes program titles 98A, punctuation 100A, transition words 102A and subject matter description 104A. Note that in the following description of FIGS. 4–8, specific examples of program guides and program guide elements such as "program guide 90A" and "narrative text 94A" are referred to with a reference number that includes an appended letter, in this case the letter "A". On the other hand, when program guides and program guide elements are referred to generally, no letter is appended (e.g., "program guides 90", which refers to all of the program guides in FIGS. 4–8).

The subject matter description 104 can refer to the general topic of the program, or it may describe a plot. The subject matter description 104 can also include actors 106 performing in the program, or alternate programing which may become available. An alternate program title 108 describes what will be shown if the primary program title 127A is not available. Though indicative of what may be included in the subject matter description 104, the examples are not exhaustive.

A hyper-link 110A is also shown as part of narrative text 94A. When selected, the hyper-link 110A instructs CPU 74 to display data from other HTML objects (see discussion regarding FIG. 7). Hyper-links 110 may be displayed to the user by using underlining, bold type, different size font, different colors, italics, shadowed text, highlighting and other like methods.

Narrative text 94A is organized according to time of transmission 96A which means that each of program titles 98A has a common time of transmission 96A. Punctuation 100A and transition words 102A are used to maintain complete sentences and create a cohesive text.

Program titles 98A are interspersed with the plot/subject matter descriptions 104A. The time of transmission 96A is indicated as Oct. 21, 1998 at 9:21 p.m., and additionally, "What's on Now." In this embodiment, the date is displayed in a descriptive phrase that is easily understood by users in addition to the current method of simply displaying dates in numerical or text form. Alternatively, the date can be displayed solely as a descriptive phrase or solely in numerical or text form.

Each program title 98 is assigned to at least one program category. The assignment to program categories is provided by the scheduling companies, or may be manually entered at the site of the program guide database 48. The association of each program title 98 to categories allows the operator to order the narrative text 94 of the program guide 90 according to a main topic or theme. The operator chooses a first category (shown in this embodiment as the time of transmission 96A) and creates a narrative text 94 which describes all the program titles 98 included in that category. Thus, in this embodiment, time of transmission 96A is used as the first-level organization for the electronic program guide 90A.

Further organization of the narrative text 94A is accomplished using a second organizational category. In the embodiment shown in FIG. 4, this second-level organization is done by topical categories 112A. A topical category groups programs using the general subject matter of the program. Topical categories 112A in the FIG. 4 embodiment include sports 114A, comedy 116A, news 118A, action 120A and drama 122A. This is by no means an exhaustive list. Further topical category examples include mysteries, religion, and music. The topical categories 112A are used by the operator to provide second-level organization to the electronic program guide 90A. Thus, the topical categories 112A are used as sub-topics which tie to the overall theme of "What's on Now". This lets the operator communicate program information in an intuitive manner. The program titles 98A that are grouped together relate to each other through the topical category 112A to which they are associated.

The narrative text 94A can be further refined using third-level organization. For example, after the second-level organization using the topical category 112A of "news" 118A, a third-level of organization using the topical category 112A of "sports" or "local" can be utilized. Thus, a television program whose primary subject matter is about analysis and reporting results of local high school sports programs has a second-level organization using the topical category 112A of "news." The third-level organization uses the topical category 112A "local" (or alternatively "sports"). Thus the second-level and third-level organizational structure becomes: news/local (or alternatively, news/sports). This organizational technique can be carried further into a fourth, fifth, and sixth level, or as far as necessary to give the user sufficient clarity as to possible choices of program titles 98. Additionally, other categories of programs exist which can be used for organization. Examples of these categories include movies, time of transmission, actor and channel of transmission.

The embodiment shown in FIG. 4 shows one current time of transmission 96A displayed by the text "What's on Now" and "9:21 p.m. Thursday, Oct. 21, 1998" located at the top of the screen. The time of transmission 96A, the first-level organizational category, is displayed in guide title region 92A, furthering the effect of the magazine or story-like format of electronic program guide 90A. Alternate categories may be used in guide title region 92A to create a different organizational structure of narrative text 94A in electronic program guide 90A.

Figure 5:
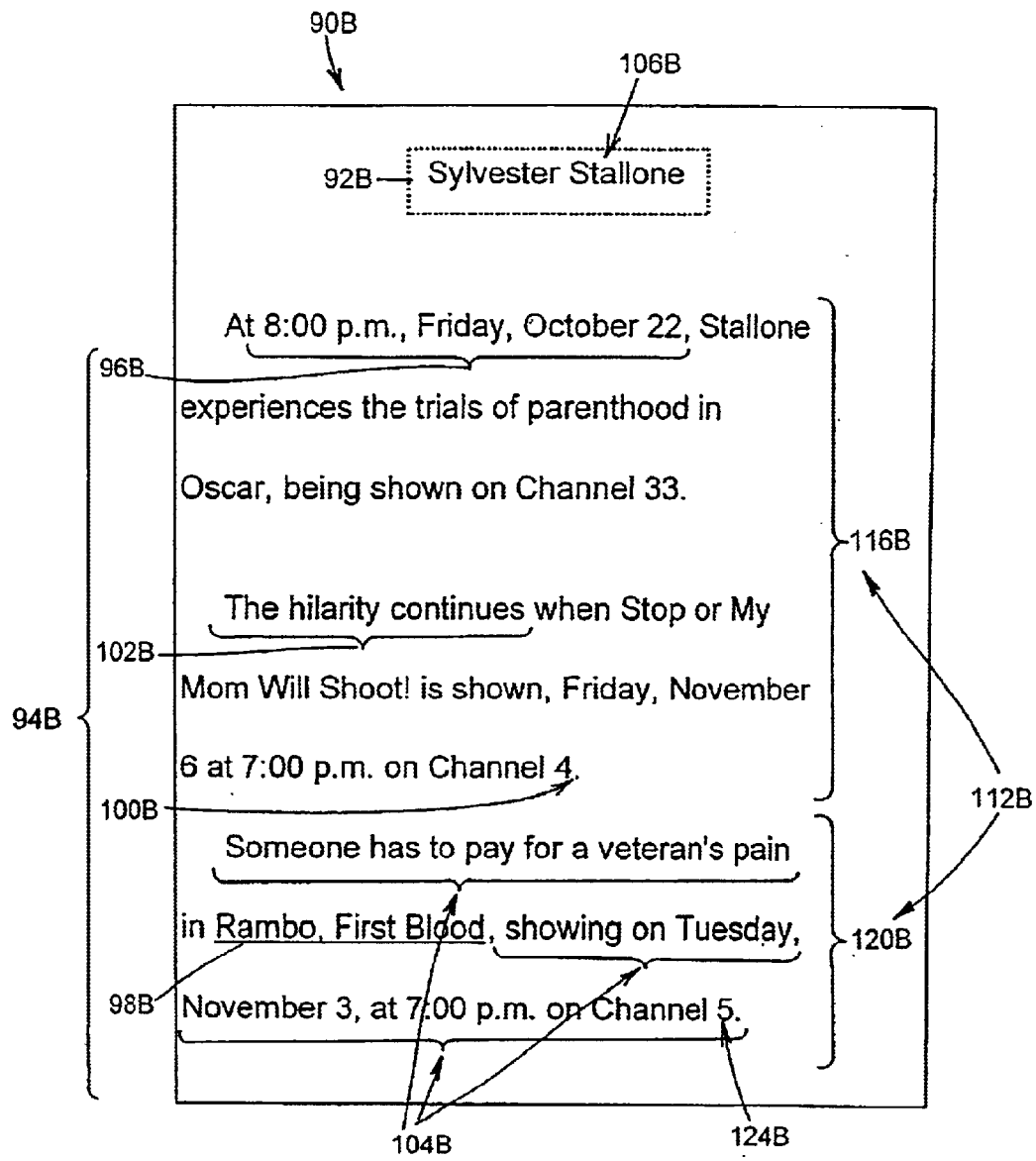
FIG. 5 depicts a display showing a television program guide in accordance with an embodiment of the present invention, primarily organized by actor.

As shown in FIG. 5, one such alternate embodiment displays actor 106B in guide title region 92B of electronic program guide 90B. Narrative text 94B includes times of transmission 96B for program titles 98B, as well as subject matter description 104B. Narrative text 94B is written in sentence form, using appropriate punctuation 100B and transition words 102B. Here, a channel of transmission 124B is used as part of subject matter description 104B. Narrative text 94B uses actor 106B as the first-level organization category and is then further organized by using topical categories 112B of comedy 116B and action 120B. These second-level organizational categories are used to divide the program information into paragraphs.

Figure 6:
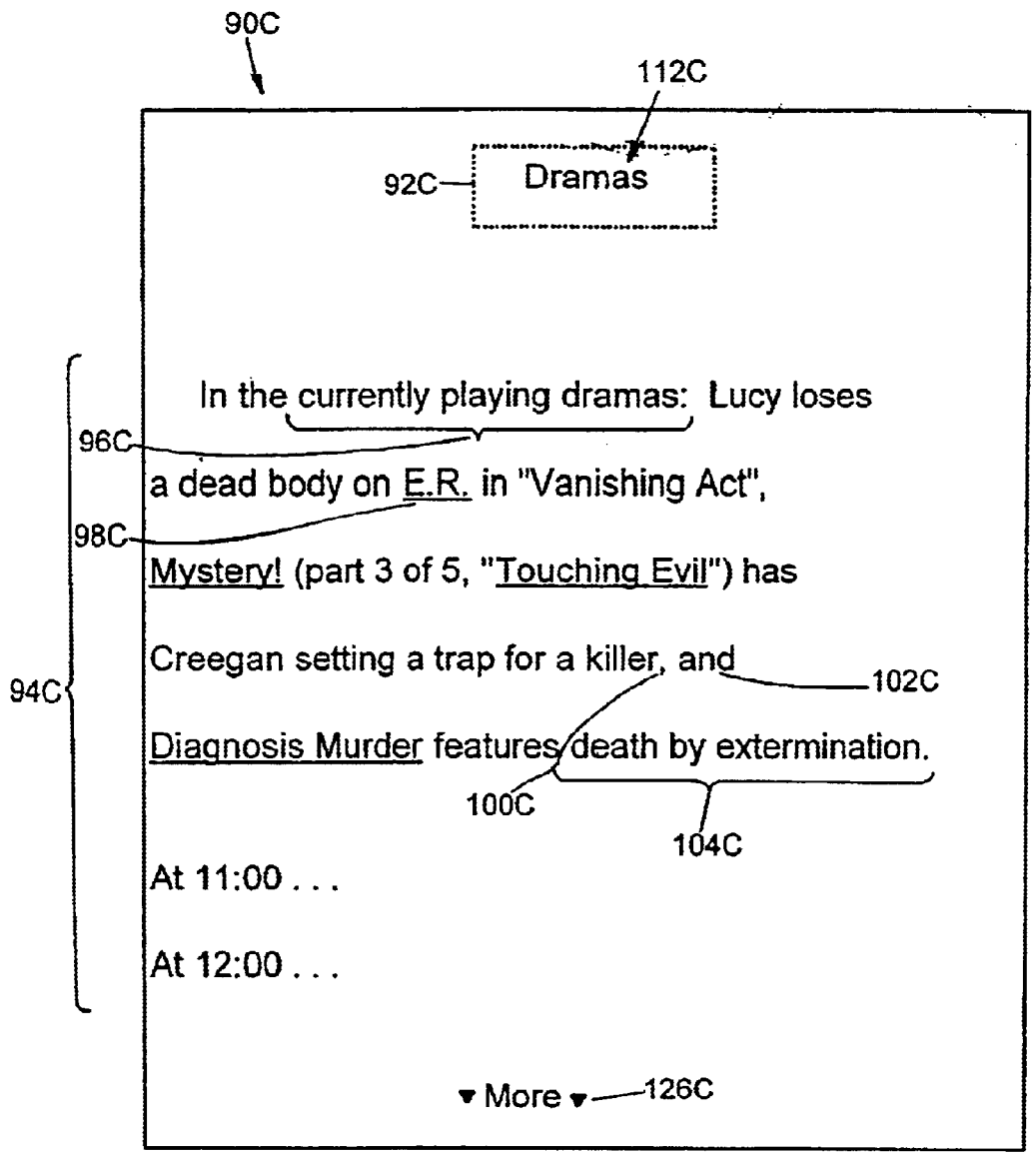
FIG. 6 depicts a display showing a television program guide in accordance with an embodiment of the present invention, primarily organized by topical category.

FIG. 6 shows another preferred embodiment of electronic program guide 90. In program guide 90C, topical category 112C is used as the first-level organizational category. Here, guide title region 92C of narrative text 94C contains the topical classification "dramas." Narrative text 94C includes program titles 98C, subject matter description 104C, and times of transmission 96C. Once again, transition words 102C and punctuation 100C are used in narrative text 94C to give the text a magazine or story-like format. The second-level organization is accomplished using the time of transmission 96C of the program.

A scrolling pointer 126C is located at the bottom of the display. Pointer 126C indicates to the user that more information exists than can fit on the display area of television 66. Utilizing remote control 86, the user can scroll down to display more narrative text 94C.

Program information such as a time of transmission 96 can be used as a first-level organization category shown in guide title region 92. The same program information can alternatively be used for second-level organization. To illustrate, time of transmission 96 may be used in the guide title region 92 of the electronic program guide 90 (i.e. "What's on Now"), giving the first-level organization of narrative text 94. Alternatively, it may be used as the second-level organization by which narrative text 94 is further arranged. For example, using the topical category 112 of "Dramas" 122 as the first-level organization, time of transmission 96 may be used for the second-level organization. Time of transmission 96 could be used to separate dramas which start at 7:00 p.m. from dramas which start at 8:00 p.m. Similar to topical categories 112, time of transmission 96 may be broken into sub-categories and used at different organizational levels. To illustrate, time of transmission 96 can be divided into the following sub-categories: week, day, morning, afternoon, and hour. Thus, the first-level organization may be what is playing on a specific day and the second-level organization maybe what is playing each hour. Alternatively, the first-level organization can be what is playing at a specific hour, with a second-level organization of what is playing on a series of days at that hour. The operator has discretion as to what organizational structure he or she wishes to use when he or she creates the HTML objects at the transmission station 26. The user may then choose the guide created by the operator which most suits the user's needs. This can be done by using hyper-links 110 to navigate to the guide format which the user desires.

Other categories and combination of categories may be used to organize the electronic program guide. Examples of other categories which could be used as a level of organization are program titles 98 (as an example, narrative text 94 gives a description of times of transmission 96 and channels of transmission 124 for one program title 98) and named operator categories.

Figure 7:
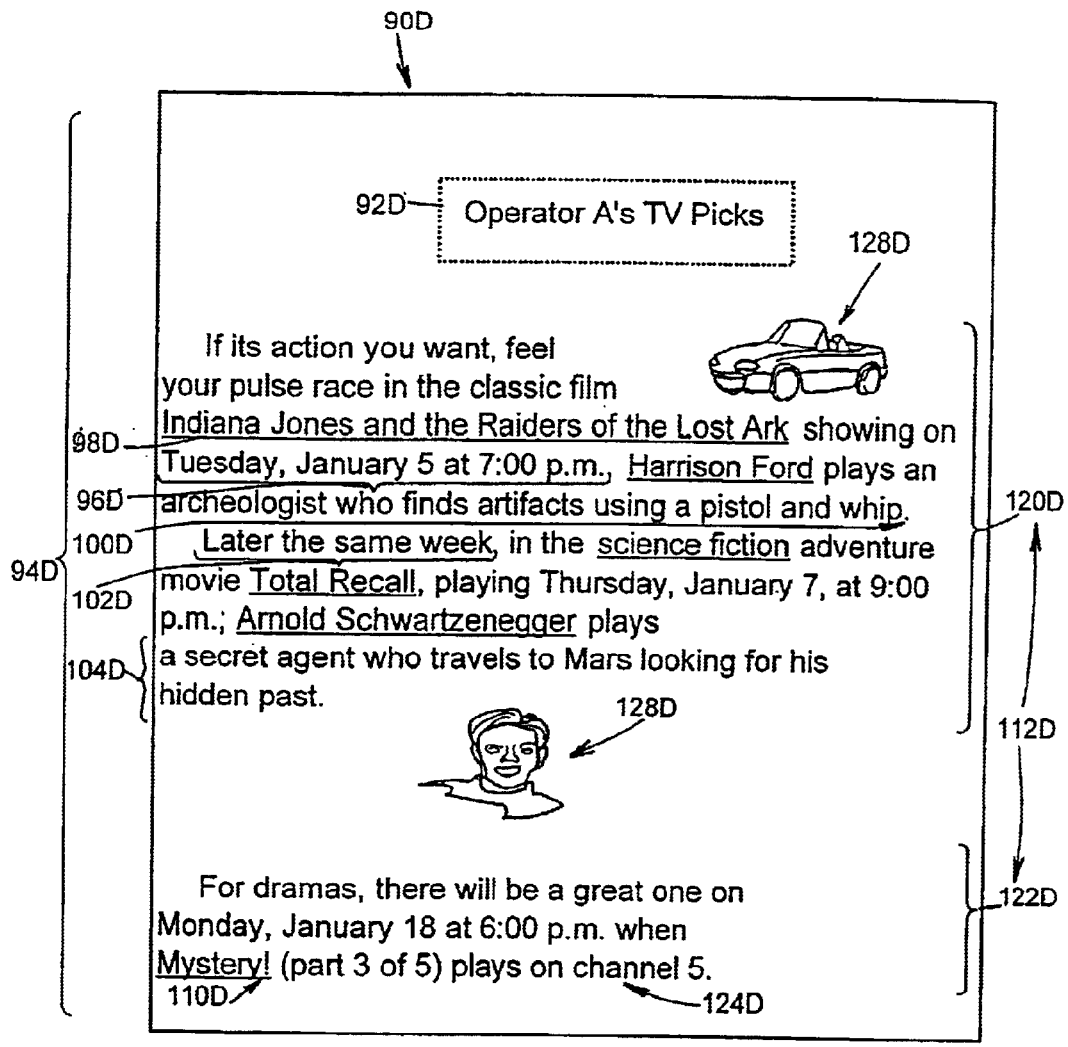
FIG. 7 depicts a display showing a television program guide in accordance with an embodiment of the present invention, primarily organized by a named operator.

A named operator category allows a user to choose to display programs and program information that has been entered by a particular operator. The user may choose an operator whose editorial descriptions she enjoys. One example of using an operator category as an organizational category in electronic program guide 90 is shown in FIG. 7. Guide title region 92D of narrative text 94D shows the first level of organization as "Operator A's T.V. Picks." The operator uses punctuation 100D and transition words 102D and subject matter descriptions 104D to provide editorial plot descriptions to narrative text 94D. Program titles 98D are chosen by the operator according to his or her likes or dislikes. The second level organization classification used by the operator is through the use of topical categories 112D. Here, action 120D and drama 122D are used.

The electronic program guide 90D is supplied with hyper-links 110D, which are identified in this embodiment by underlined text. Other ways of displaying hyper-links to the user include using bold type, different size font, different colors, italics, shadowed text, highlighting and other like methods.

One purpose of hyper-links 10 is to give the user the option of requesting additional information about the text which is underlined. Selecting a hyper-link 110 causes a user information request to be generated. If the user chooses hyper-link 110, receiver 64 will generate a display of additional information about the hyper-link 110 that is selected. For example, selecting hyper-link 110, which refers to a program title 98, results in the CPU 74 displaying text that includes more plot information and a list of actors in the selected program, as well as other information the user may be interested in. Additional information may include the time of transmission 96D and the channel of transmission 124D. Any program information may be displayed in the form of hyper-links 110, allowing the user to link to another HTML object that contains hyper-links. This continuous linkage allows the user to navigate through a series of displays and eventually attain the exact information for which he is searching. Alternatively, hyper-links 110 may be interspersed in narrative text 94 allowing a user to tune directly to a channel which contains television content being described in the narrative text 94. For example, if the narrative text 94 is discussing the cable station CNN, or a program currently playing on CNN, a hyper-link 110 can be interspersed in the narrative text 94, which when selected, instructs the receiver to tune to the channel where CNN is transmitted. These types of hyper-links are further discussed with respect to FIG. 8.

Pictorial representations 128D can be interspersed in the text as shown in FIG. 7. These may be hyper-links 110 or may simply serve to illustrate the text. Pictorial representations 128D can be still pictures or icons. Alternatively, pictorial representations 128D can be video clips which roll when requested by the user, or which run continuously. Similarly, color coding, highlighting, or other methods (such as bold type, different size font, etc.) can be used for highlighting text that is not tied to a hyper-link 110. In one embodiment, color is used to differentiate text associated with different topical classifications. For example, all text relating to action adventure programming is colored blue, while all text relating to dramas is colored yellow.

Typically, hyper-link 110 links the user to one of three basic destinations, although other destinations may be added. The first destination for the hyper-link 110 is to another HTML object. The user selects hyper-link 110 using remote control 86 (shown in FIG. 3). As described previously, a signal indicating an information request is received by IR receiver 84 and is transmitted to logic circuit 80. Logic circuit 80 informs CPU 74 of the request. In response to the request, CPU 74 causes memory 78 to transfer the HTML object specified by the hyper-link to the D/A converter 72 which then transmits the HTML page to television 66.

Figure 8:
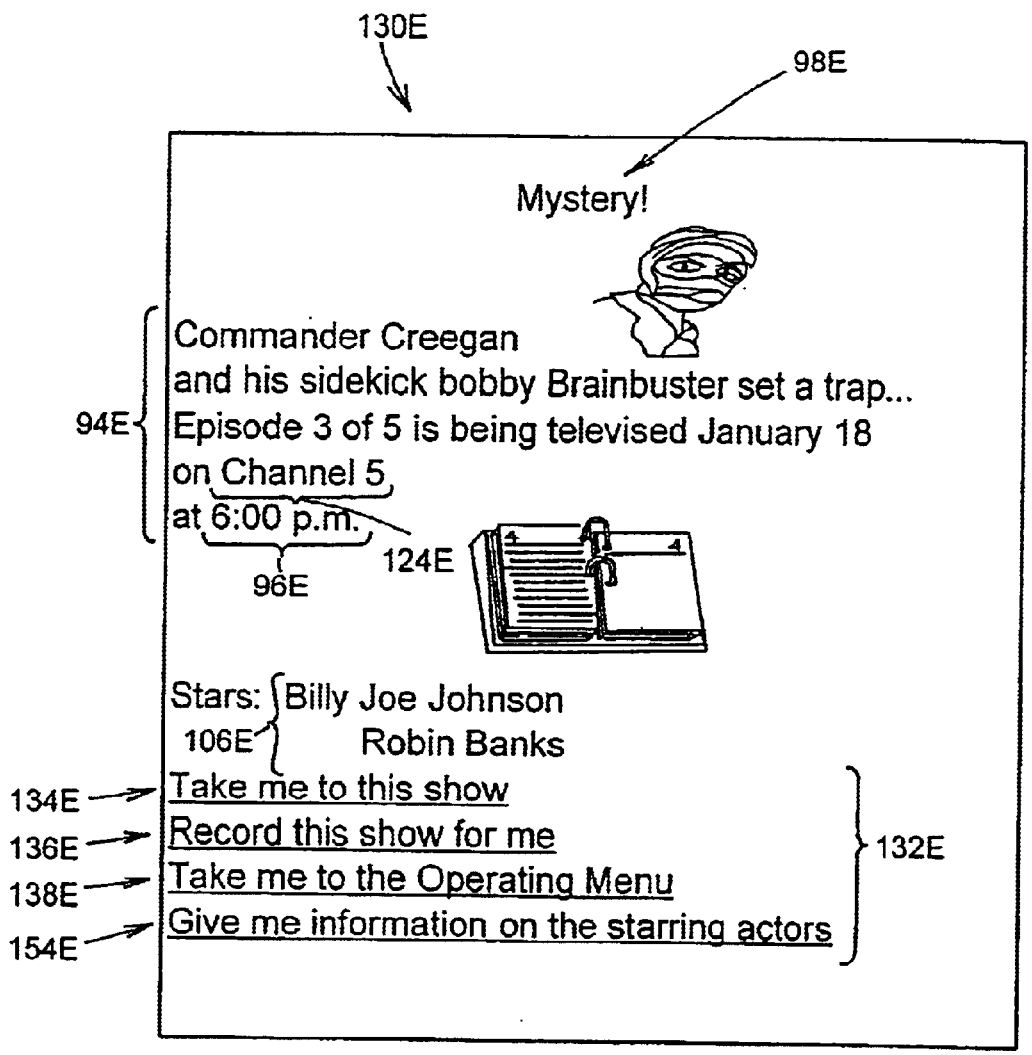
FIG. 8 depicts a display showing a television program guide in accordance with an embodiment of the present invention, showing additional program information.

FIG. 8 illustrates one example of a sub-guide 130E which is shown after a user has chosen hyper-link 110D (shown in FIG. 7). The receiver displays additional narrative text 94E, which describes a more detailed plot synthesis, as well as time of transmission 96E, actors 106E staring in the production, channel of transmission 124E and a list of options 132E which themselves are hyper-links 110. As in previous embodiments, the user moves a cursor or other selection indicator over the hyper-link 110 he wishes to choose and then selects the hyper-link 110 by pressing a select or enter button on the remote control 86 (FIG. 3).0

A list of options 132E shows an example of command style hyper-links, the second main destination of hyper-links 110. These links cause something to happen other than the transferal of program guide information. For example, the user is able to tune to the desired program by selecting a hyper-link 134 which instructs the receiver 64 (see FIG. 3) to tune to the correct channel of transmission 124. Additionally, the sub-guide 130E includes a hyper-link 136 which can activate a recording device 68 immediately or in the future to record the desired program. If a user selects automatic recording for an entry, receiver 64 will instruct recording device 68 to start recording the desired program at the start of the program, and cause recording device 68 to end recording when the desired program is over. A hyper-link (not shown) can also exist to allow the user to place a reminder of an upcoming program. The receiver 64 would then indicate to the user when his or her selected television program was being transmitted. Any number of additional command style hyper-links can exist as part of the electronic program guide 90, or the operating menus. Although these hyper-links 110 are shown displayed in a list of options 132E, the command style hyper-links can also be located in narrative text 94 as part of the electronic program guide 90, or listed as choices in an operating menu 140. The hyper-link 138E shows an example of a hyper-link which, when selected, results in the display of an operating menu 140. The operating menu 140 can alternatively be displayed by selecting a "menu" button on remote control 86.

Figure 9:
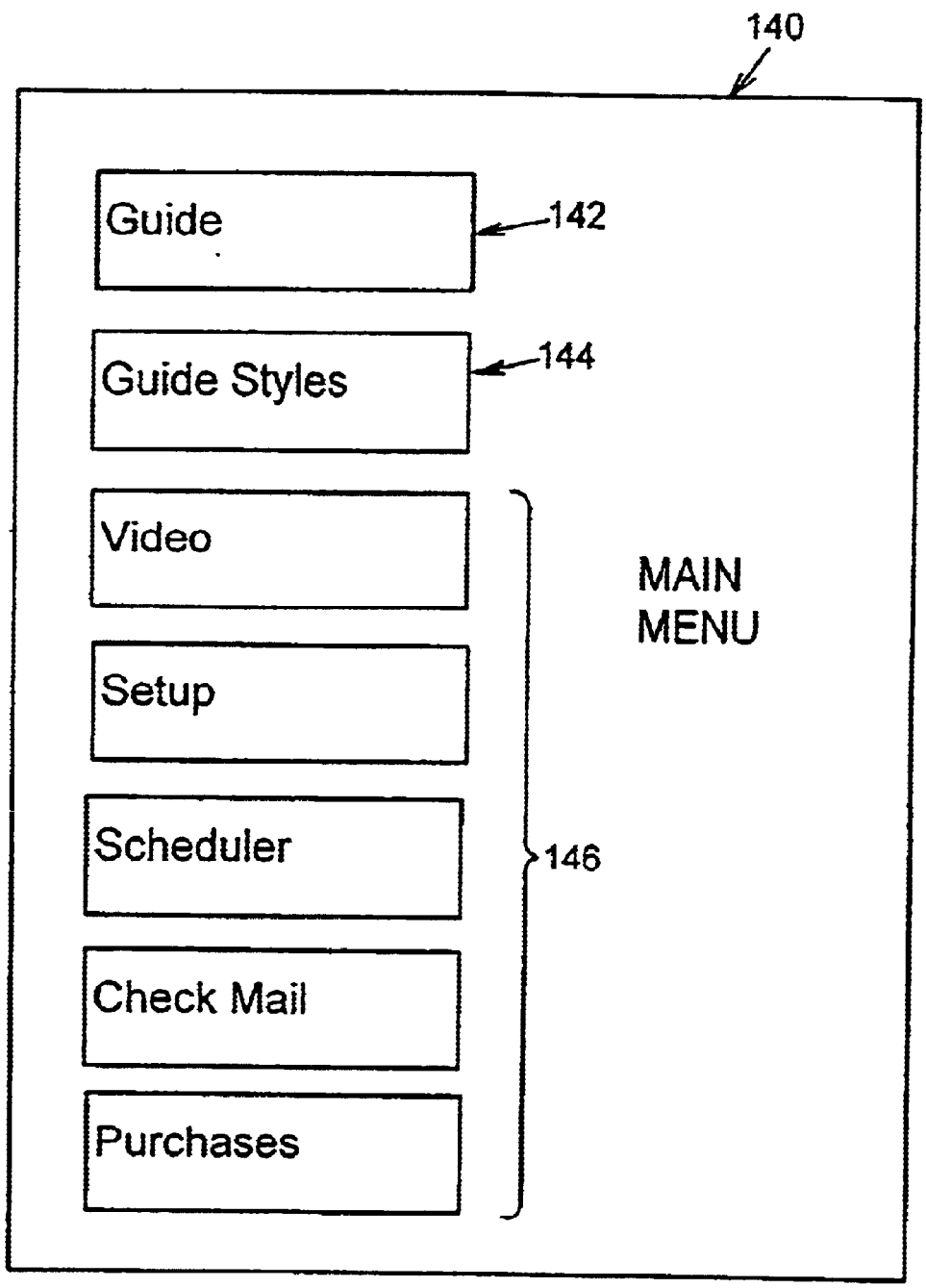
FIG. 9 depicts a display showing an operating menu in accordance with an embodiment of the present invention.

An example of the operating menu 140 is shown in FIG. 9. The operating menu 140 is generated by the receiver 64 and does not rely on program guide data to be generated. The display is "hard wired" into the receiver 64, meaning a digital image of menu 140 is stored in memory 78.

The operating menu 140 shown in FIG. 9, includes a guide link 142, a guide styles link 144, and a list of feature links 146. The feature links 146 allow the user to perform an action which is not directly related to the information in the electronic program guide 90. For example, links can exist which allow the user to check electronic mail, purchase items through an electronic catalog, or adjust the color or brightness of the signal to their television. These feature links 146, therefore are not directly related to scheduling information or the electronic program guide 90.

The guide link 142 allows the user to request the receiver 64 to display the electronic program guide 90. For example, the receiver 64 could display the operating menu display 140 when the user pressed the "menu" button on remote control 86. The user could then select the guide link 142 from the operating menu 140 in order to display the electronic program guide 90. This manner of requesting the receiver 64 to display the electronic program guide is by no means the only way to accomplish this task. As discussed above, the remote control 86 can also contain a "guide" button which, when selected, displays the electronic program guide 90. Other methods may also be used to accomplish this task.

Figure 10:
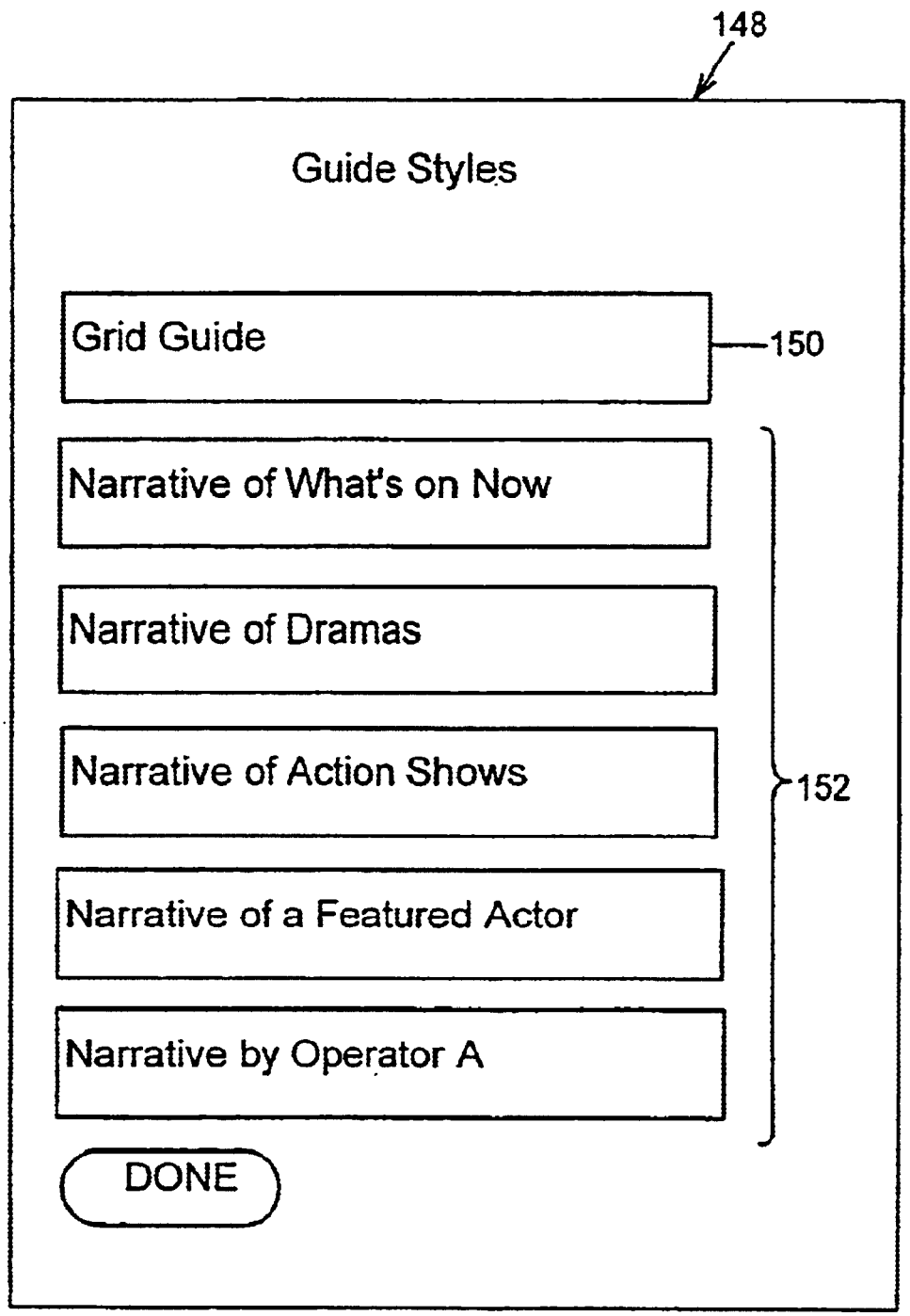
FIG. 10 depicts a sub-operating menu in accordance with an embodiment of the present invention.

The guide styles link 144 shows one method of allowing the user to select the electronic program guide 90 embodiment which he or she prefers. An example of what may be generated after a user selects the guide styles link 144 is shown in FIG. 10. A sub-menu 148 is generated by receiver 64. Similar to the operating menu 140, the sub-menu 148 is generated by receiver 64 using a digital image stored in memory 78. The digital image for the sub-menu 148 contains blank areas where titles to different program guide embodiments can be inserted. These titles are drawn from the program guide data and are inserted into the blank areas as guide links. The sub-menu 148 includes a grid guide link 150 and narrative text program guide links 152. By selecting one of the narrative text program guide links 152, the user can choose the style of electronic program guide 90 that he or she wishes to view. Choosing the grid guide link 150 would display the prior art program guide utilizing the grid style format. Choosing one of the narrative text program guide links 152 would display an embodiment of the narrative text electronic program guide 90 described above and illustrated in FIGS. 4–8.

Although hyper-links may be used to allow the user to select various options such as tuning to a particular television program, directing the receiver 64 to record a program, and setting a reminder (as discussed previously), alternate methods can exist to choose these options. Buttons may exist on remote control 86 which allow the user to directly request these options. Once the user has highlighted a program title 98, he or she may simply press the option button which performs the desired function (i.e. "record this program" or "set reminder"). Other methods can exist to accomplish this task.

Program objects other than HTML objects stored in memory are the third main destination of hyper-links 110. Program objects, channel objects, boot event objects, and their descriptors may be pointed to by hyper-links 110. These hyper-links 110 point to information stored in receiver 64 (FIG. 3). The use of program objects and their descriptors would occur when HTML objects did not exist to provide the information requested. After selecting the hyper-link 110, the receiver 64 would access the appropriate object and display the information requested by the user. An example of this type of hyper-link 154E is shown in FIG. 8. The hyper-link 154E points to information in memory 78 about the actors 106E starring in the identified program title 98E. This information can be identified through the name system discussed previously. After searching memory 78, the receiver 64 displays any information that matches the names of the actors 106E. This can include information on roles played and other program titles 98 with which they are associated.

This alternate electronic program guide format gives users an intuitive way to decide on a program they wish to view. Because the guide is set up using narrative text, the guide is unobtrusive and immediately understandable.

Although the present invention has been described with reference to preferred embodiments, workers skilled in the art will recognize that changes may be made in form and detail without departing from the spirit and scope of the invention.

What is claimed is:

1. A device for displaying program information in an on-screen video display comprising:

a tuner adapted to receive electronic program guide data;

a memory operatively coupled to the tuner and adapted to store the electronic program guide data;

a converter operatively coupled to the memory and the tuner, the converter being adapted to convert the electronic program guide data into an on screen video display arranged into organizational categories, wherein the on-screen video display comprises narrative text written in a story-like format, wherein the narrative text comprises paragraphs and wherein the organizational categories provide a first-level organization that defines overall content of the on-screen video display and a second-level organization that defines the content of the paragraphs of the narrative text;

a user interface receiver adapted to receive a user command; and a controller communicatively coupled to the user interface receiver, the converter and the tuner, the controller being adapted to receive the user command and to control the converter and the tuner.

2. A device for displaying program information in an on-screen video display comprising:

a tuner adapted to receive electronic program guide data;

a memory operatively coupled to the tuner and adapted to store the electronic program guide data;

a converter operatively coupled to the memory and the tuner, the converter being adapted to convert the electronic program guide data into an on-screen video display arranged into organizational categories, wherein the on-screen video display comprises a hyper-link associated with information for display and wherein the on-screen video display is narrative text written in a story-like format, wherein the narrative text comprises paragraphs and wherein the organizational categories provide a first-level organization that defines overall content of the on-screen video display and a second-level organization that defines the content of the paragraphs of the narrative text;

a user interface receiver adapted to receive a user command to select the hyper-link; and a controller communicatively coupled to the user interface receiver, the converter and the tuner, the controller being adapted to receive the user command and to control the converter and the tuner to display the information associated with the hyper-link.

3. The device of claim 2, wherein the organizational categories provide additional levels of organization to the on-screen video display.

4. The device of claim 2, wherein the organizational categories comprise colors and the colors distinguish the organizational categories.

5. A method of displaying program information in an on-screen video display comprising:

receiving electronic program guide data;

storing the electronic program guide data;

converting the electronic program guide data into an on-screen video display, wherein the on-screen video display comprises a hyper-link associated with information for display and wherein the on-screen video display comprises the step of displaying the on-screen video is displayed as narrative text written a story-like format, wherein converting the electronic program guide data into an on-screen video display comprises providing narrative text comprising paragraphs and organizational categories that provide a first-level organization that defines over content of the on-screen video display and a second-level organization that defines the content of the paragraphs of the narrative text;

receiving a user command to select the hyper-link; and displaying the information associated with the hyper-link.

6. The method of claim 5, wherein the organizational categories provide additional levels of organization to the on-screen video display.

7. The method of claim 5, wherein the organizational categories comprise colors and the colors distinguish the organizational categories.

8. A system for distributing and processing data representative of an electronic program guide, the system comprising: a program guide data transmitting system adapted to receive and process schedule feeds to produce program guide data and to broadcast the program guide data wherein the schedule feeds include information representative of: a plurality of program titles, each title representing a television program; a subject matter description for each television program; a time of transmission for each television program; a guide title giving a topical organization for the program guide; and a hyper-link associated with information for display; a receiver station adapted to receive the broadcast of the program guide data from the program guide data transmitting system, wherein the receiver station comprises: a tuner adapted to receive the program guide data; a memory operatively coupled to the tuner and adapted to store the program guide data; a converter operatively coupled to the tuner and adapted to store the program guide data; a converter operatively coupled to the memory and the tuner, the converter being adapted to convert the program guide data into an on-screen video display, wherein the on-screen video display comprises a hyper-link associated with information from display and wherein the narrative text comprises text in which the plurality of titles, the subject matter description and time of transmission are written in a story-like manner; a user interface receiver adapted to receive a user command to select the hyper-link; and a controller communicatively coupled to the user interface receiver and the tuner, the controller being adapted to receive the user command and the control the tuner to display the information associated with the hyper-link.

9. The system of claim 8, wherein the on-screen video display further comprises organizational categories that are used as topics and themes to organize the program guide.

10. The system of claim 9, wherein the organizational categories are distinguished through the application of color.

11. The system of claim 10, wherein the narrative text is at least partially comprised of a plurality of pictorial presentations.

12. The system of clam 11, wherein some of the narrative text is distinguished from the remaining narrative text through application of color.

13. The system of claim 9, wherein the narrative text is organized at least in part based on the organizational categories.

* * * * *